No. 778,772. Patented December 27, 1904.

UNITED STATES PATENT OFFICE.

WILHELM BEHAGHEL AND GUSTAV CURT SCHUMANN, OF LUDWIGS-HAFEN-ON-THE-RHINE, GERMANY, ASSIGNORS TO BADISCHE ANILIN AND SODA FABRIK, OF LUDWIGSHAFEN-ON-THE-RHINE, BAVARIA, GERMANY.

PROCESS OF MAKING HYDROXYALKYLANILIN.

SPECIFICATION forming part of Letters Patent No. 778,772, dated December 27, 1904.

Application filed September 15, 1904. Serial No. 224,619.

*To all whom it may concern:*

Be it known that we, WILHELM BEHAGHEL, a subject of the Grand Duke of Baden, and GUSTAV CURT SCHUMANN, a subject of the King of Saxony, both residing at Ludwigshafen-on-the-Rhine, in the Kingdom of Bavaria, German Empire, have invented new and useful Improvements in Processes for the Manufacture of Hydroxyalkyl Derivatives, of which the following is a specification.

Our invention relates to the manufacture of intermediate compounds belonging to the hydroxyethylanilin class which are of use in preparation of coloring-matters.

The method hitherto employed in the production of hydroxyethylanilin, which consists in heating together anilin and glycolchlorhydrin, (cf. *Berichte*, Vol. 22, page 2092, and *Journal für praktische Chemie*, Vol. 44, page 17,) has the disadvantage that by-products (principally dihydroxydiethylanilin, diphenylethylenediamin, and diethylenedianilin) are produced in relatively large quantities, and these by-products have to be separated from the hydroxyethylanilin.

We have discovered that the reaction proceeds much more satisfactorily when the two components are heated together in water solution, because then the yield of hydroxyethylanilin is much larger and only extremely small quantities of dihydroxydiethylanilin are formed, the other two of the hereinbefore-named by-products not being produced at all.

A further advantage of the process according to our invention is that it is not necessary to produce the glycolchlorhydrin in the pure state, as the water solution of glycolchlorhydrin, which is obtained during the production of glycolchlorhydrin, can be employed.

We have also discovered that other glycolhalogenhydrins can be employed (for instance, glycolbromhydrin) and also that instead of anilin other amido aromatic compounds can be employed and derivatives of hydroxyethylanilin be obtained.

In order to obtain a good yield of the hydroxyethylanilin, it is advisable either to use at least two (2) molecular proportions of the amido compound to every molecular proportion of the glycolhalogenhydrin or else to add instead of the excess of amido compound a substance (such, for example, as sodium acetate or sodium carbonate) which has the power of neutralizing mineral acid. If a salt of a carboxylic acid of an amido compound (for instance, anthranilic acid) be employed, one (1) molecular proportion thereof is sufficient.

The following examples will serve to further illustrate the nature of our invention, which, however, is not confined to these examples. The parts are by weight.

Example 1: Boil together for two (2) hours in a vessel provided with a reflux condenser one hundred and eighty-six (186) parts of anilin, two hundred (200) parts of water, and eighty (80) parts of glycolchlorhydrin. Make the resulting solution alkaline and distil with steam in order to remove the excess of anilin from the hydroxyethylanilin. In this example instead of anilin other primary or secondary amins (such, for instance, as toluidin, xylidin, naphthylamin, and monoethylanilin) can be employed and corresponding compounds be obtained.

Example 2: Boil together for two (2) hours one hundred and fifty-nine (159) parts of the sodium salt of anthranilic acid, three hundred (300) parts of water, and eighty (80) parts of glycolchlorhydrin. On cooling, the hydroxyethylanilin-ortho-carboxylic acid separates out as an oil, which, however, rapidly becomes solid.

In all cases other glycolhalogenhydrins, such as glycolbromhydrin, can be used instead of glycolchlorhydrin.

What we claim is—

1. The process for the production of hydroxyalkyl derivatives of aromatic amins which consists in heating a glycolhalogenhydrin with an aromatic amin in the presence of water.

2. The process for the production of hydroxyethylanilin which consists in heating a glycolhalogenhydrin with anilin in the presence of water.

3. The process for the production of hydroxyethylanilin which consists in heating a glycolhalogenhydrin with anilin in the presence of water and of a substance which has the power of neutralizing mineral acid.

4. The process for the production of hydroxyethylanilin which consists in heating a glycolhalogenhydrin with anilin in the presence of water and of sodium acetate.

5. The process for the production of hydroxyethylanilin which consists in heating together glycolchlorhydrin with anilin in the presence of water.

6. The process for the production of hydroxyethylanilin which consists in heating together glycolchlorhydrin with anilin in the presence of water and of a substance which has the power of neutralizing mineral acid.

7. The process for the production of hydroxyethylanilin which consists in heating together glycolchlorhydrin with anilin in the presence of water and of sodium acetate.

In testimony whereof we have hereunto set our hands in the presence of two subscribing witnesses.

WILHELM BEHAGHEL.
GUSTAV CURT SCHUMANN.

Witnesses:
J. ALEC. LLOYD,
JOS. H. SEUTE.